July 13, 1965 R. S. WEISZ ETAL 3,195,116

NONDESTRUCTIVE READOUT MEMORY

Filed July 25, 1962

ROBERT S. WEISZ
SALVATORE ZUCCARO
MARIO SEMERARO
INVENTORS

BY Lyon & Lyon
ATTORNEYS 3,195,116
Patented July 13, 1965

3,195,116

NONDESTRUCTIVE READOUT MEMORY

Robert S. Weisz, Pacific Palisades, Los Angeles, Salvadore J. Zuccaro, Santa Monica, and Mario Semeraro, Sherman Oaks, Calif., assignors to Ampex Corporation, Redwood City, Calif., a corporation of California Filed July 25, 1962, Ser. No. 212,204
2 Claims. (Cl. 340—174)

This invention relates to magnetic data storage systems and, more particularly, to improvements therein.

In an application for United States Letters Patent by Raymond Stuart-Williams, Serial No. 48,885, now Patent No. 2,162,845, which is assigned to a common assignee, there is described a Magnetic Information-Storage Device. This memory may comprise a plate of magnetic ferrite material which has a rectangular grid of grooves laid out on one surface thereof. A first set of wires, each of which extends in a different groove along one co-ordinate of the grid, is designated as drive wires. A second set of wires, each of which extends in a different groove along the other co-ordinate of the rectangular grid, is designated as sense wires.

Should a current be applied to one of the drive wires, no voltages are induced in any of the sense wires which cross or intersect each other, in view of the fact that the wires intersect one another at right angles, and, therefore, the lines of flux which are established by current flowing in the drive wire are not cut by the sensing wires. However, should a piece of magnetic material be placed as a bridge along the diagonal and the intersection of a drive line and a sense line, then the bridging material serves to distort the path of any lines of flux which are established by a current in the drive line, so that the sense line will be cut by these lines of flux and a voltage will be induced therein. The polarity of the voltage which is induced in the sensing wire and thus the data which is stored is determined by the orientation of the bridging magnetic ferrite material. That is, if it is disposed along one diagonal at the intersection of a sense and drive line, the voltage will have one polarity. If it is disposed along the opposite diagonal, then the polarity of the induced voltages are reversed. This type of memory can also store data by using the presence or absence of the bridging member to represent the data stored, but the other method of operation is preferred.

An object of this invention is to provide an improved construction for the type of nondestructive readout memory which has been described.

Another object of the present invention is the provision of a memory of the type described where the entry of data is simplified.

Yet another object of the present invention is to provide a memory of the type described which is simple to manufacture and more inexpensive than its predecessor.

These and other objects of the invention may be achieved by providing a sheet of a nonmagnetic material, such as a plastic film, which serves as the base for a rectangular grid of conductors. One portion of the rectangular grid of conductors, consisting of spaced parallel conductors extending along one co-ordinate, is deposited on one surface of the sheet, and the remainder of the grid of spaced parallel conductors extending along another co-ordinate is deposited on the opposite surface of the sheet. Thus, effectively, the grid of conductors provide a plurality of noncontacting crossings or intersections. If the conductors extending along one co-ordinate are designated as the drive lines and the conductors extending along the other co-ordinate are designated as the sense lines, then a current which is made to flow along one of the drive lines will have associated therewith a magnetic field. However, no voltage is induced in any of the intersecting sense lines in view of the fact that the orientation of the driving and sense lines is such that there is no cutting of these lines of flux in the magnetic field which is established, and, therefore, these lines are not magnetically coupled to one another. However, it is possible by the provision of a magnetic coupling member at the intersection of a drive and sense line to distort the magnetic field established by current in the drive line sufficiently to result in a voltage being induced in the sense line to which it is magnetically coupled.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 2, 3:
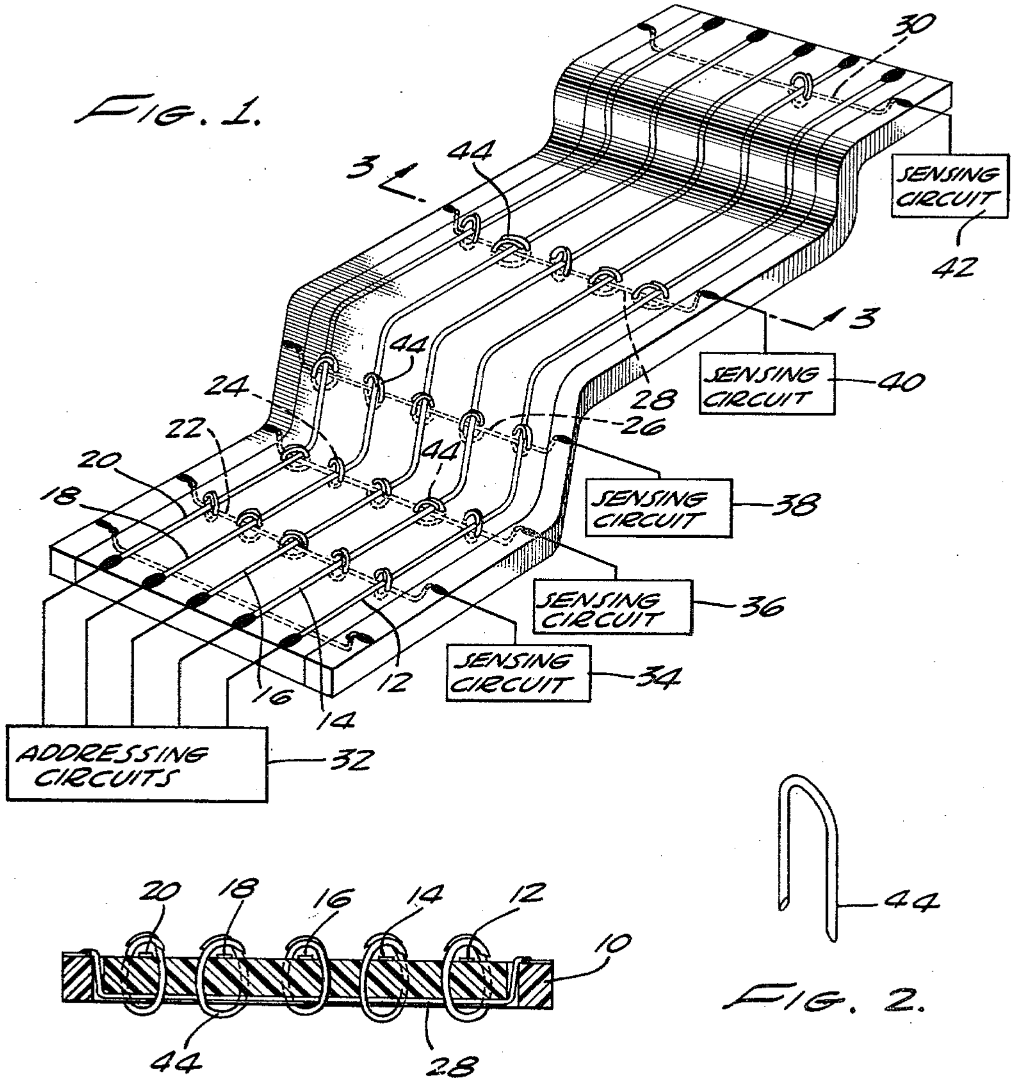
FIGURE 1 is a view in perspective of an embodiment of the invention.
FIGURE 2 illustrates a magnetic staple of the type which is employed with this invention.
FIGURE 3 is a view in section along the lines 3—3 of the embodiment of the invention shown in FIGURE 1.

Referring now to FIGURE 1, there may be seen an isometric view of an embodiment of the invention. A sheet 10 of nonmagnetic material, which may be a plastic, and which, if desired, may also be flexible, serves as the base for supporting a rectangular wire grid. This grid consists of drive lines or wires, respectively 12, 14, 16, 18, and 20, which are deposited on the top surface of the sheet 10 and which extend parallel to one another along the length thereof, and sense lines, respectively 22, 24, 26, 28, and 30, which are deposited or imbedded on the opposite surface of the sheet 10 and which extend spaced parallel to one another and transversely to the drive lines across the bottom surface of the sheet 10. It will be appreciated that the number of drive and sense lines shown in the drawing is merely illustrative and not to be considered as a limitation of the numbers of these which may be employed with this memory.

The drive and sense lines, of course, may be deposited by using printed circuit techniques if desired. The drive lines are selectively addressed or have current selectively applied thereto by the addressing circuit 32. Each one of the sense lines connects to a separate sensing circuit, respectively 34, 36, 38, 40, and 42. Each one of the sense lines in each one of the drive lines is brought out to a terminal tab at the edge of the sheet to simplify electrical connections. If desired, each one of these terminal tabs may be brought out to the same side of the sheet 10 shown in FIG. 1. The convolutions of sheet 10 in FIG. 1 are shown to indicate that the support for the grid may be made of a flexible plastic material such as a polyethylene.

Upon the application of current to one of the drive lines respectively 12 through 20 from the addressing circuits 32, in the absence of any other structure which will couple the drive line to a sense line, no voltage, is induced in any of the sense lines which intersect the excited drive line. The reason is that the respective lines are orthogonally disposed relative to one another and, therefore, no lines of magnetic flux will cut a sense line. However, by means of a magnetic coupling member such as a staple 44 which is shown in FIG. 2, which is made of a magnetic material, such as Permalloy, the lines of flux which are provided by the magnetic field resulting from the current flowing in the drive line are distorted sufficiently to cut the sense wire. As a result, when a current pulse is applied to a drive line from the addressing circuit, a voltage is induced in each one of the sense circuits connected to a sense line which is magnetically coupled to the excited drive line. The manner of magnetically coupling a drive to a sense line with a staple may be done by using any one of the known stapling tools.

In FIG. 3, there may be seen a view in section along the lines 3—3 whereby both the disposition of the sense and driving lines on opposite sides of the sheet 10 and the manner of magnetic coupling of the staple 44 are shown. Effectively, the staple is closed upon itself, thus forming a closed magnetic path having lower reluctance than the air. Therefore, whenever current flows along the drive line, magnetic lines of flux will be established in the staple whereby upon build-up or collapse of these magnetic lines of flux, the sense line is then cut by these lines of flux and a voltage is induced therein.

The representation of a binary bit stored in the memory shown in FIG. 1 can be achieved either by the presence or absence of a staple or by the orientation of the staple relative to the intersection. That is, when a staple is placed to extend along one diagonal at the intersection, a voltage of one polarity is induced in the sense line. When the staple is placed along the other diagonal at the intersection, then a voltage of opposite polarity is induced in the sense line. The latter method of data storage in the memory, that is by storing a one or zero by the position of the magnetic staple, is the preferred one, however.

The size of the memory in accordance with this invention is determined by the number of drive and sensing lines laid down on a sheet. The number of binary bits of data read out from the memory is determined by the number of sensing lines intersected by an excited drive line. If the insulating sheet or base upon which the conductors are laid out is flexible, then the memory can be stored by rolling it up, preferably around another sheet of insulating material to prevent lines or conductors from touching each other, or the memory may be folded over in accordion fashion to reduce the storage space required.

Data may be changed in this memory even after entry by removing a staple and replacing it with another having the desired orientation relative to the intersection.

There has accordingly been described and shown herein a novel and improved nondestructive readout magnetic memory wherein a magnetic member which encircles an intersection of two orthogonally disposed wires determines the binary bit which is stored. The memory is simpler and more inexpensive to manufacture than those employed heretofore of this type.

We claim:

1. A data storage device comprising a sheet of non-magnetic material, a plurality of first wires disposed on one surface of said sheet spaced parallel to one another, along a first coordinate, a plurality of second wires disposed on the opposite surface of said sheet spaced and parallel from one another and disposed orthogonally relative to said plurality of first wires to provide a plurality of crossings therewith, and a plurality of stapes made of magnetic material, each of said staples being bent around and enclosing a different one of said plurality of crossings of said first and second wires along a diagonal passing through said crossing.

2. A data storage device as recited in claim 1 wherein said non-magnetic sheet is made of a flexible material and said pieces of magnetic material are made of Permalloy.

References Cited by the Examiner

UNITED STATES PATENTS

| | | | |
|---|---|---|---|
| 2,778,005 | 1/57 | Allen | 340—174 |
| 2,911,627 | 11/59 | Kilburn et al. | 340—174 |
| 2,934,748 | 4/60 | Steimen | 340—174 |
| 2,985,948 | 5/61 | Peters | 340—174 |
| 3,117,368 | 1/64 | Bartik | 340—174 |

IRVING L. SRAGOW, *Primary Examiner.*